(12) United States Patent
Villa

(10) Patent No.: US 9,434,092 B2
(45) Date of Patent: Sep. 6, 2016

(54) DEVICE FOR SEPARATING DOSES OF PLASTICS MATERIAL

(75) Inventor: Fabrizio Villa, Imola (IT)

(73) Assignee: SACMI COOPERATIVA MECCANICI IMOLA SOCIETA' COOPERATIVA (IT)

( * ) Notice: Subject to any disclaimer, the term of this patent is extended or adjusted under 35 U.S.C. 154(b) by 322 days.

(21) Appl. No.: 14/236,086

(22) PCT Filed: Jun. 26, 2012

(86) PCT No.: PCT/IB2012/053223
§ 371 (c)(1),
(2), (4) Date: May 5, 2014

(87) PCT Pub. No.: WO2013/017968
PCT Pub. Date: Feb. 7, 2013

(65) Prior Publication Data
US 2014/0241106 A1 Aug. 28, 2014

(30) Foreign Application Priority Data
Aug. 2, 2011 (IT) .............................. MO2011A0198

(51) Int. Cl.
| | |
|---|---|
| B29C 31/04 | (2006.01) |
| B29C 43/34 | (2006.01) |
| B29B 7/26 | (2006.01) |
| B29C 43/08 | (2006.01) |

(52) U.S. Cl.
CPC .............. B29B 7/26 (2013.01); B29C 31/048 (2013.01); B29C 43/34 (2013.01); B29C 43/08 (2013.01); *B29C 2043/345* (2013.01); *B29C 2043/3461* (2013.01); *B29C 2043/3466* (2013.01)

(58) Field of Classification Search
CPC .. B29C 31/042; B29C 31/045; B29C 31/048
See application file for complete search history.

(56) References Cited

U.S. PATENT DOCUMENTS

| | | |
|---|---|---|
| 2007/0134361 A1 | 6/2007 | Ritz et al. |
| 2009/0127076 A1 | 5/2009 | Balboni et al. |
| 2010/0021580 A1* | 1/2010 | Swanson ............... B29C 31/042 425/132 |

FOREIGN PATENT DOCUMENTS

| | | |
|---|---|---|
| EP | 1101586 A2 | 5/2001 |
| EP | 1101587 A2 | 5/2001 |
| EP | 1782938 A1 | 5/2007 |
| WO | 03047831 A1 | 6/2003 |

* cited by examiner

Primary Examiner — Tony G Soohoo
Assistant Examiner — Elizabeth Insler
(74) Attorney, Agent, or Firm — Laubscher, Spendlove & Laubscher, P.C.

(57) ABSTRACT

A device for separating a plurality of doses of plastics from a plurality of extruder outlets (2,3) comprises a movable element that carries two groups of dose separating elements (A) wherein at least a first group is movable with respect to at least a second group. The separating device expels the doses in a circular arrangement for subsequent compression molding of a liner (17,18) for a container closure (C).

14 Claims, 17 Drawing Sheets

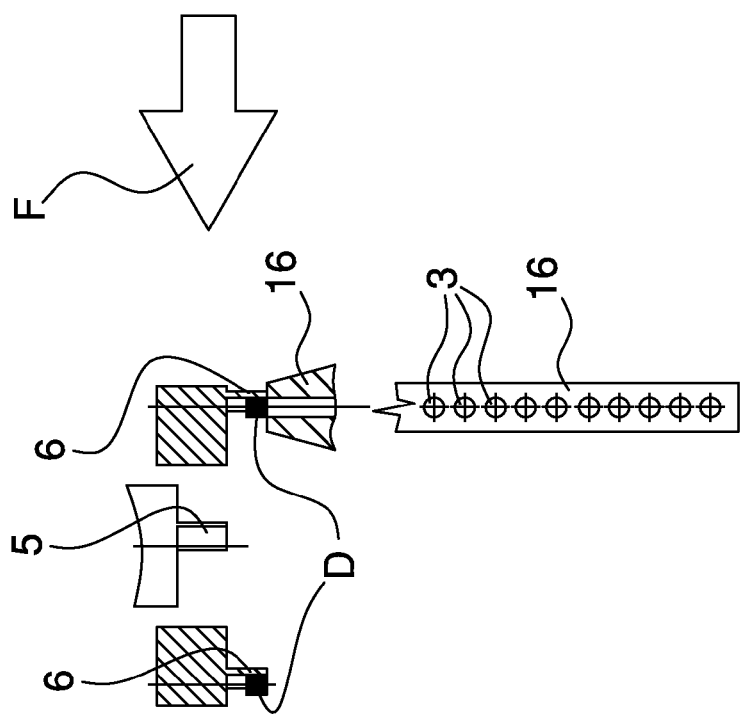
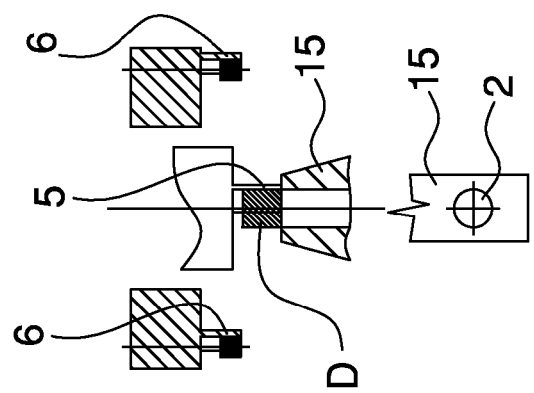
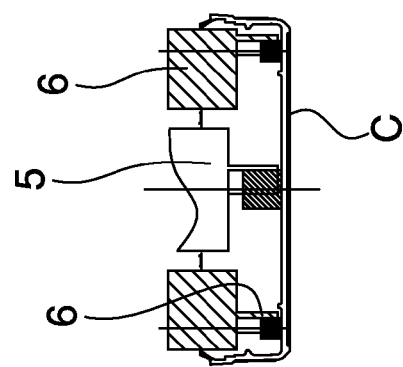
Fig. 16

DEVICE FOR SEPARATING DOSES OF PLASTICS MATERIAL

This application is a §371 National Stage Entry of PCT International Application No. PCT/IB2012/053223 filed Jun. 26, 2012. PCT/IB2012/053223 claims priority to IT Application No. MO2011A000198 filed Aug. 2, 2011. The entire contents of these applications are incorporated herein by reference.

BACKGROUND OF THE INVENTION

The invention relates to a device for separating multiple doses from an extruding device for extruding synthetic plastics.

Specifically, but not exclusively, the invention can be applied to supply the synthetic plastics intended for forming the annular liner of a closure for containers, such as, for example, a lid for a jar or a cap for a bottle.

In particular, reference is made to a device for separating a multiplicity of doses of plastics and then for depositing the doses of plastics, for example directly inside a closure for containers, such that at least one part of the deposited doses has an annular arrangement. This annular arrangement will in fact facilitate the formation, for example through compression of the doses, of the internal sealing liner of the closure for containers.

Forming an annular liner by means of a process that comprises separating a multiplicity of doses from an extruder, placing the doses in a circular arrangement and subsequently forming the annular liner by compressing the doses is already known.

The known technique disclosed above nevertheless has some limits and drawbacks.

In the first place there exist certain structural and/or functional constraints that limit the maximum number of the doses and/or the minimum diameter of the liner.

With reference to FIG. 1, with A the various dose separating elements are indicated and with B the corresponding extruder outlets from which the plastics exit. In general, a dose separating element is concave and faces forwards, with reference to the advancing of the separating element to the outlet of the extruder.

A first constraint is the diameter D of the dose, which in general must not be less than the height of the dose.

Another constraint is the thickness of the wall of the separating element, which will be, generally, between 0.75 and 1 millimeter.

A further constraint is the distance between a separating element and the holes of the extruder outlets, which distance must in general be greater than at least 0.7 millimeters.

Taking account of at least these constraints, it is very difficult, if not impossible, to form liners with a very small diameter Dp, especially if such liners are relatively very heavy, i.e. require the use of a large quantity of plastics.

Further, it is not possible to increase over a certain limit the number of doses of plastics (and the consequent number of extruder openings and of dose separating elements) for a certain liner diameter Dp.

Each of documents US 2007/134361, EP 1101587, EP 1101586 and US 2009/127076 discloses a device according to the preamble of claim 1.

SUMMARY OF THE INVENTION

One object of the invention is to overcome one or more of the aforementioned limits and drawbacks.

One advantage is to provide a device for separating a relatively high number of doses of plastic.

One advantage is to almost simultaneously separate a relatively high number of doses from an extruding device for extruding synthetic plastics.

One advantage is to provide a device for separating a plurality of doses from an extruding device and then placing the doses in an annular arrangement with a relatively reduced diameter.

One advantage is separating a plurality of doses from an extruding device and then arranging part of the doses in an external annular arrangement and another part of the doses inside the external annular arrangement (where in the context of the overall present description the meaning of "annular arrangement" may include the meaning that will be disclosed in further detail below).

One advantage is separating multiple doses to enable the liners for closing relatively small containers to be subsequently formed.

These objects and advantages, and still others, are obtained by the device according to one or more of the claims set out below.

In one example, a device for separating a plurality of doses of plastics comprises a plurality of extruder outlets, from which said plurality of doses is separated, and a movable element that carries two or more groups of dose separating elements in which at least a first group of elements is movable on said movable element with respect to at least a second group of elements.

In one example, the separating device is controlled in such a manner that the second group of dose separating elements, which is arranged at least partly behind the first group of dose separating elements (with reference to an advancing direction of the movable element), meets some extruder outlets whilst the first group of dose separating elements, arranged at least partly in front, is arranged in a non-interference position (for example a raised position) and subsequently the first group of dose separating elements is moved (for example downwards) to take on a position in which it meets other extruder outlets.

In one example, the separating device is configured for expelling the doses in an arrangement that is at least partly annular for subsequent forming (by compression of plastics) of a sealing liner of a closure for containers.

BRIEF DESCRIPTION OF THE DRAWINGS

The invention can be better understood and implemented with reference to the enclosed drawings that illustrate some non-limiting examples thereof.

FIG. 16 is a diagram of another embodiment of a movable element that carries dose separating elements according to the invention, in which a dose separating element is shown in three different operating configurations in sequence.

DETAILED DESCRIPTION

Figure 1:
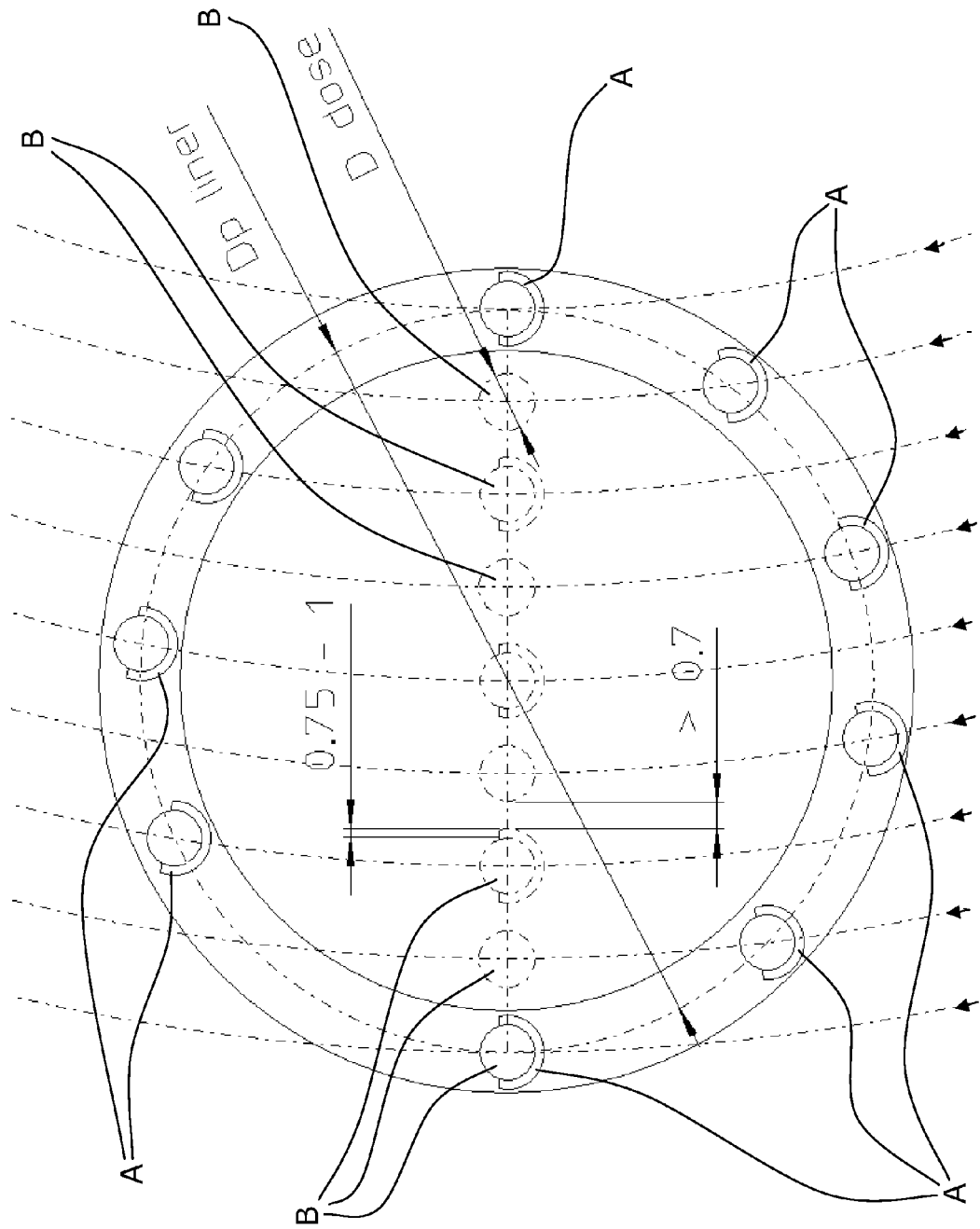
FIG. 1 is a diagram of an arrangement of dose separating elements and of extruder openings.

With reference to the aforesaid figures, with a separating device 1 is shown for almost simultaneously separating a plurality of doses from a corresponding plurality of extrusion flows that exit an extruding device for extruding synthetic plastics. The separating device 1 can be arranged, in particular, in the context of an apparatus for forming annular liners that will form the sealing liners inside closures for containers, in particular in an apparatus for forming liners by compression of synthetic plastics.

The separating device 1 includes an extruding device for extruding synthetic plastics having a first group of extruder outlets 2 and a second group of extruder outlets 3 arranged at a greater height than the first group of extruder outlets 2. In this specific example, the first group of extruder outlets 2 includes a plurality of extruder outlets and the second group of extruder outlets 3 includes a plurality of extruder outlets, although it is possible to provide other examples, according to the invention, in which the first group of extruder outlets includes a single extruder outlet and/or the second group of extruder outlets 3 includes a single extruder outlet.

The separating device 1 includes a movable element 4 that is movable in an advancing direction F along a closed loop path arranged in such a manner as to pass, at each rotation, opposite the extruding device. In the specific case, the movable element 4 rotates with a vertical rotation axis, along a horizontal circular path.

The separating device 1 comprises a first (front) group of dose separating elements 5 carried by the movable element 4 to separate, at each revolution of the movable element, doses of plastics from the first group of extruder outlets 2. The separating device 1 further comprises a second (rear) group of dose separating elements 6 carried by the movable element 4 to separate, at each revolution of the movable element, doses of plastics from the second group of extruder outlets 3.

In the specific case, the first group of extruder outlets 2, is arranged after (with reference to the advancing direction F of the movable element) the second group of extruder outlets 3.

Figure 6:
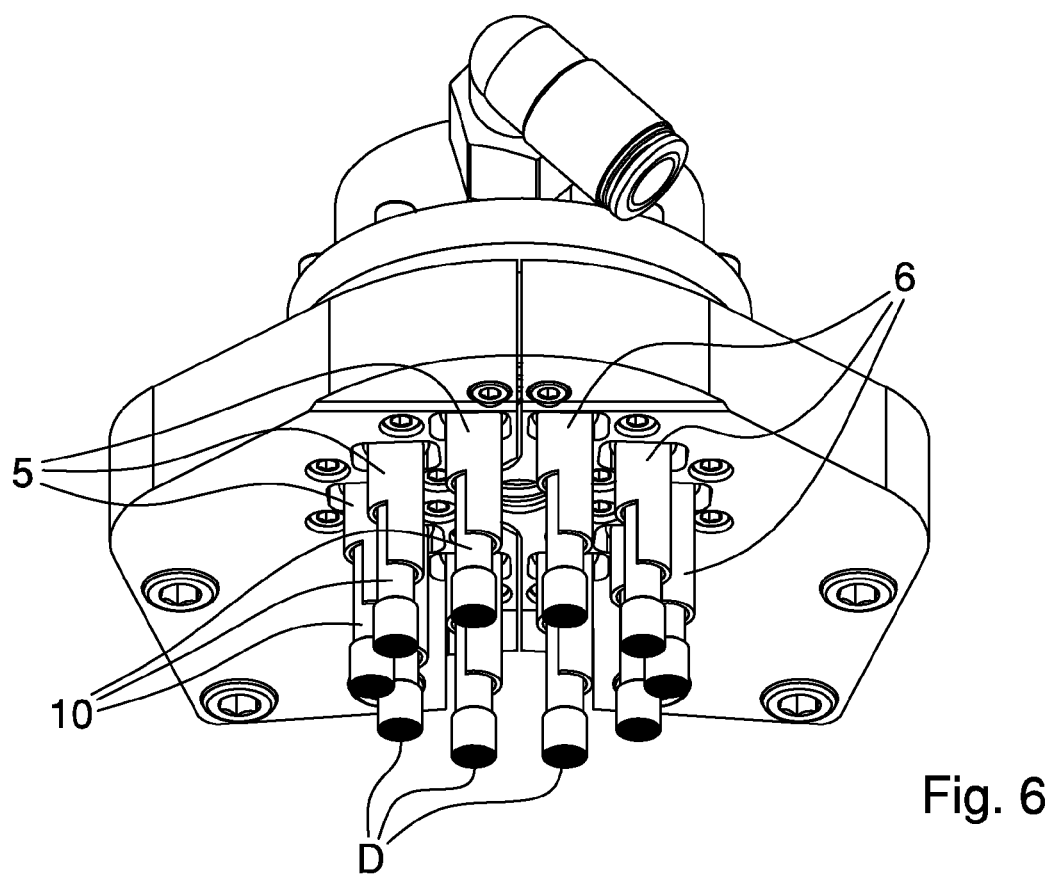
Figure 7:
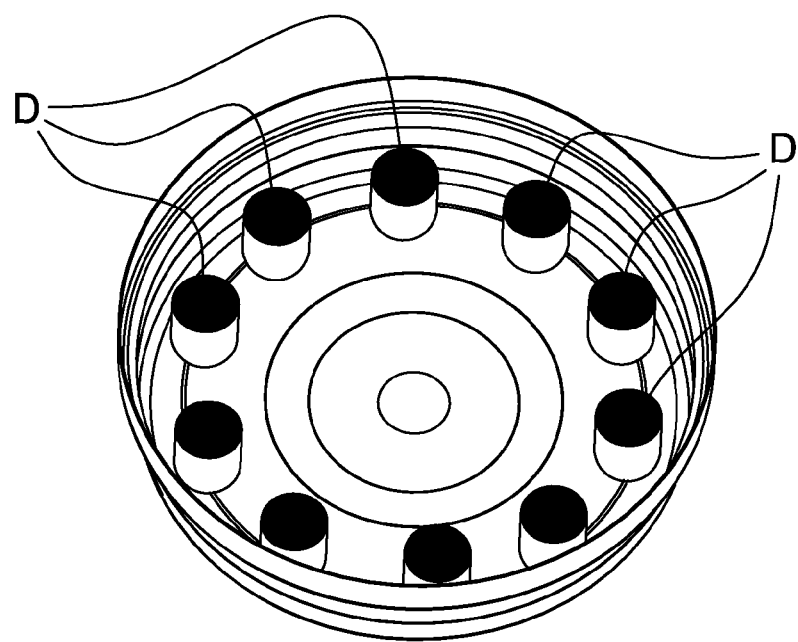
FIG. 7 shows the doses deposited by the dose separating elements in FIG. 6 inside a closure for containers.
Figure 8:
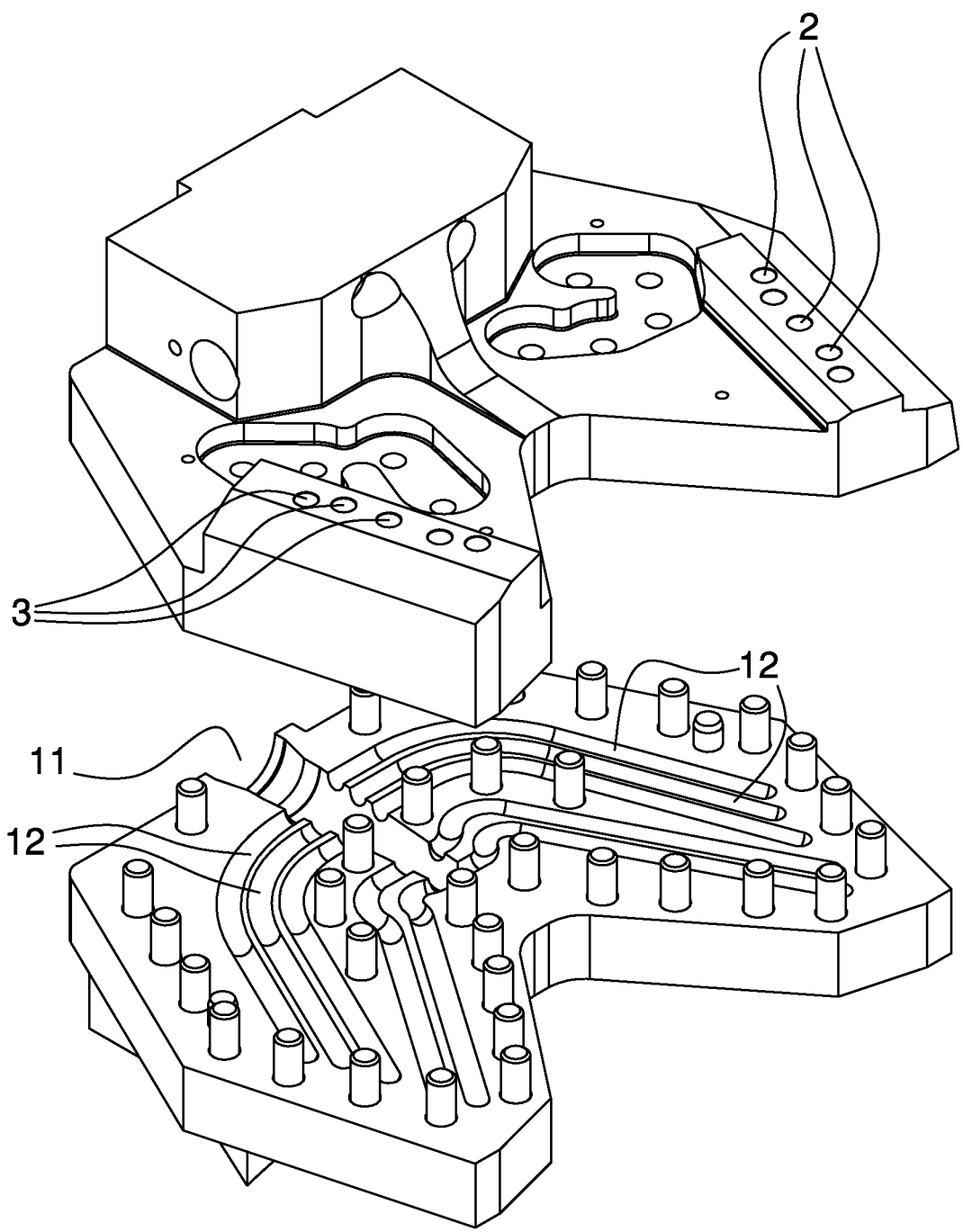
FIG. 8 shows an exploded view of the extruding device associated with the movable element in FIG. 2.
Figure 9:
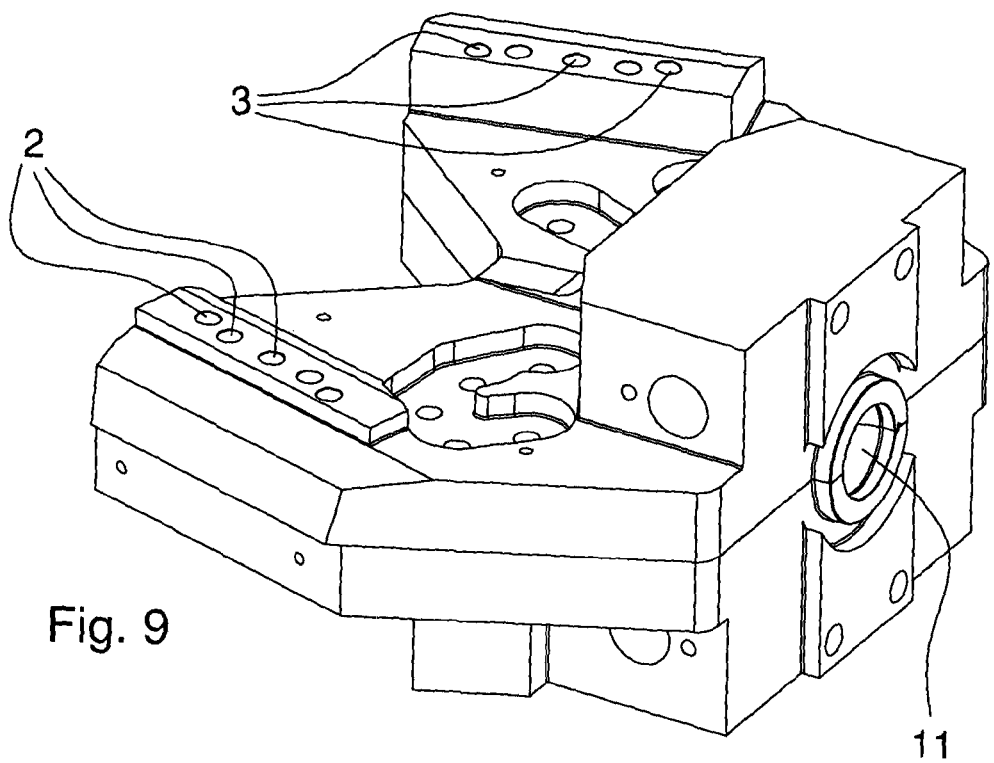
FIGS. 9 and 10 show two different prospective views of the extruding device in FIG. 8.
Figure 10:
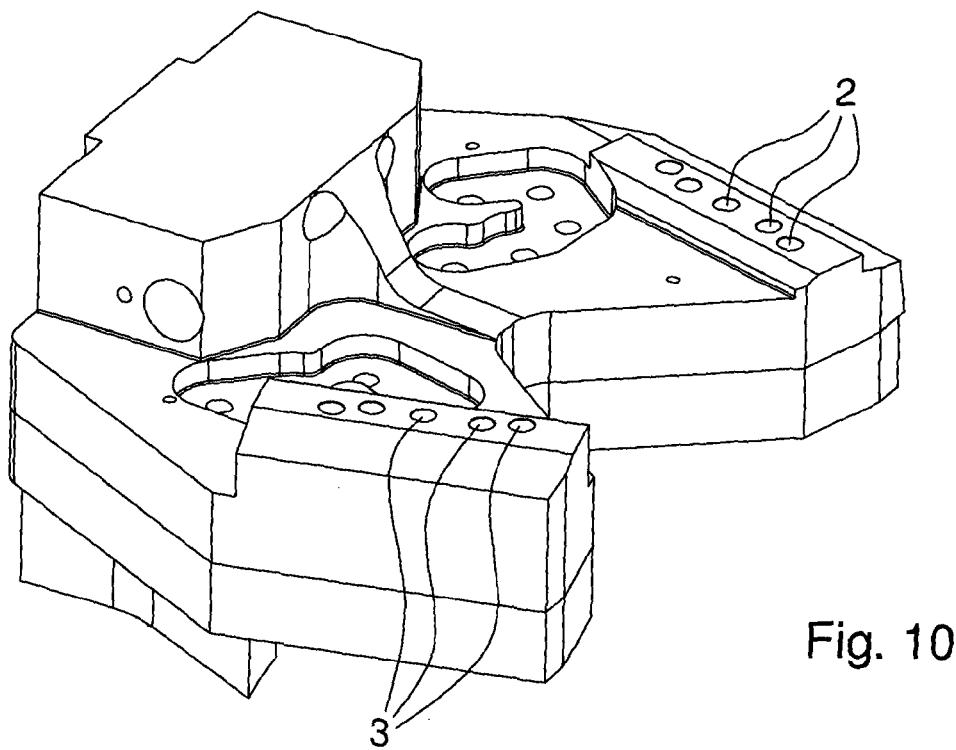

The dose separating elements of the first and of the second group, respectively 5 and 6, can be arranged on the movable element 4 such as to take on, overall, at least one annular arrangement (see, for example, FIG. 6) to enable the doses to be expelled with a corresponding annular arrangement (see, for example, FIG. 7). In the specific case, the arrangement of the various dose separating elements is circular (horizontal). In this description, "annular arrangement" can be understood (for example both with reference to the annular arrangement of the dose separating elements, and with reference to the annular arrangement of the deposited doses) in the meaning of comprising an arrangement of at least two objects that are spaced apart from one another, as well as an arrangement of at least three non-aligned objects. The term "annular" may therefore comprise, for example, an arrangement of two spaced objects in order to make it possible to arrange between the two spaced objects another object (for example a central part of a compression mould), a triangular arrangement, a circular arrangement, an elliptical arrangement, a polygonal arrangement, etc. An annular arrangement, specifically of rectangular shape with rounded edges, can be used, in particular, to form a liner in the lid of cans of food products having this specific shape.

Figure 4:
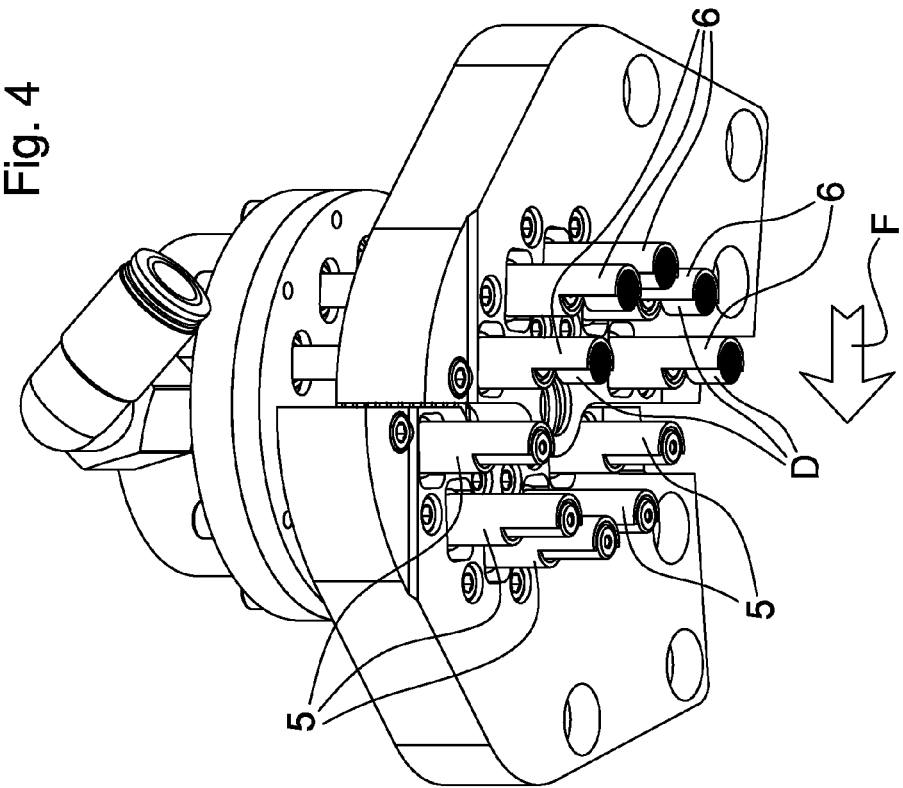

The first group of dose separating elements 5 is movable on the movable element 4, with respect to the second group of dose separating elements 6, in such a manner as to take on at least a first configuration (see FIG. 4 or FIG. 12), in which the first group of dose separating elements does not interfere, during movement of the movable element along the closed loop path, with the second group of extruder outlets or with the plastics that exit therefrom. In this first non-interference configuration the first group of dose separating elements 5 can be raised, as in the example illustrated in FIG. 4, or laterally shifted, as in the example illustrated in FIG. 12.

Figure 5:
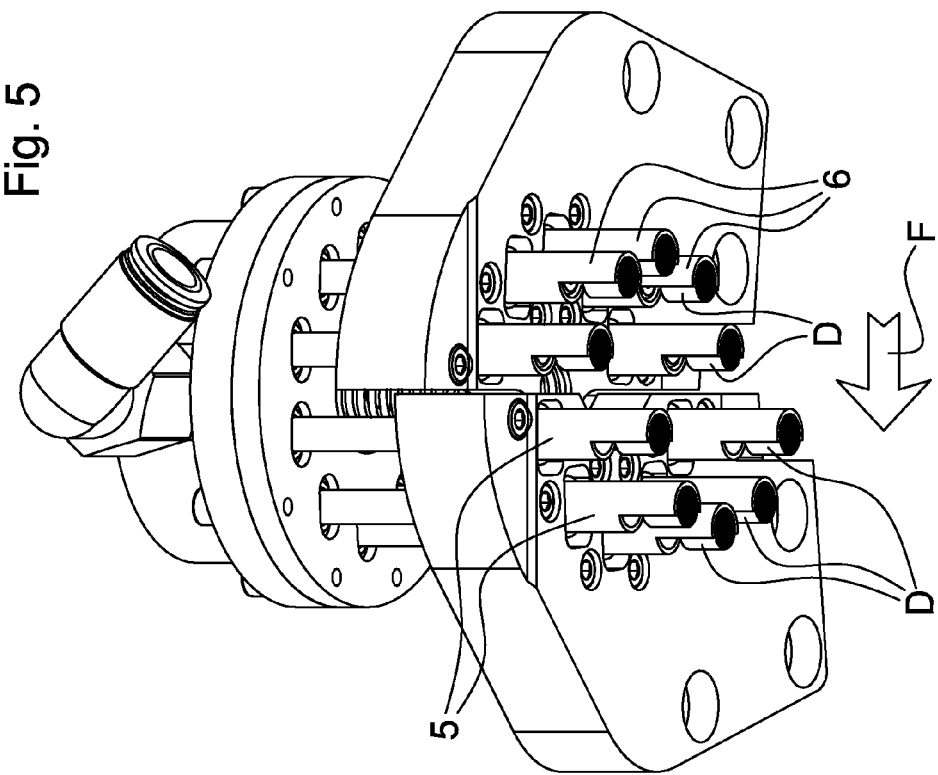
FIGS. 4 to 6 show the dose separating elements in FIG. 3, in perspective on an enlarged scale, in three different positions.

The first group of dose separating elements 5 can take on at least a second configuration (see, for example, the lowered configuration of FIG. 5), wherein the first group of dose separating elements, in the course of movement of the movable element, could interfere in an undesirable manner with the second group of extruder outlets 3 or with the plastics that exit therefrom. In order to avoid such interference, the first group of dose separating elements 5 when passing opposite the second group of extruder outlets 3, can be arranged in the first configuration of non interference (e.g. the raised configuration of FIG. 4 or the laterally shifted configuration of FIG. 12) whilst in the meantime the second group of dose separating elements 6 meets the second group of extruder outlets 3 to remove a part of the doses of plastic that will then be deposited to form a single annular liner.

The separating device 1 can include, in particular, a driving device that is able to selectively carry the first group of dose separating elements 5 in the first (raised) non-interference configuration before the passing, at each revolution of the movable element, of the first group of dose separating elements opposite the second group of extruder outlets 3, and in the second (lowered) configuration, of possible interference, after the first group of dose separating elements has passed in front of the second group of extruder outlets.

This movement (downwards, for example in a vertical direction) is shown in the right part in FIG. 3, in which the movable element 4 is visible in the first configuration, in the moment in which it passes opposite a part of the extruding device (in particular the second group of extruder outlets 3), and in the second configuration, in the moment in which it passes opposite another part of the extruding device (in particular the first group of extruder outlets 2 arranged below the second group of extruder outlets 3).

In the specific case, the first group of dose separating elements 5 is arranged, on the movable element 4, after the second group of dose separating elements 3, with reference to the advancing direction F.

The first group of dose separating elements 5 is movable on the movable element 4 in a first (vertical) direction that is transverse to the (horizontal) advancing direction F. The first group of dose separating elements 5 can be movable on the movable element by means of slidable coupling, for example along (vertical) linear sliding guides.

The first group of dose separating elements 5, when it is in the first (non-interference) configuration, leaves free a front space, i.e. arranged in front (with reference to the advancing direction F) of the second group of dose separating elements 6 to enable the latter to remove the doses correctly.

The first and the second group of extrusion outlets are arranged in such a manner that the first group of dose separating elements 5 is, in the first (raised) non-interference configuration, farther from the first (lower) group of extruder outlets 2 than from the second (upper) group of extruder outlets 3.

Figure 2:
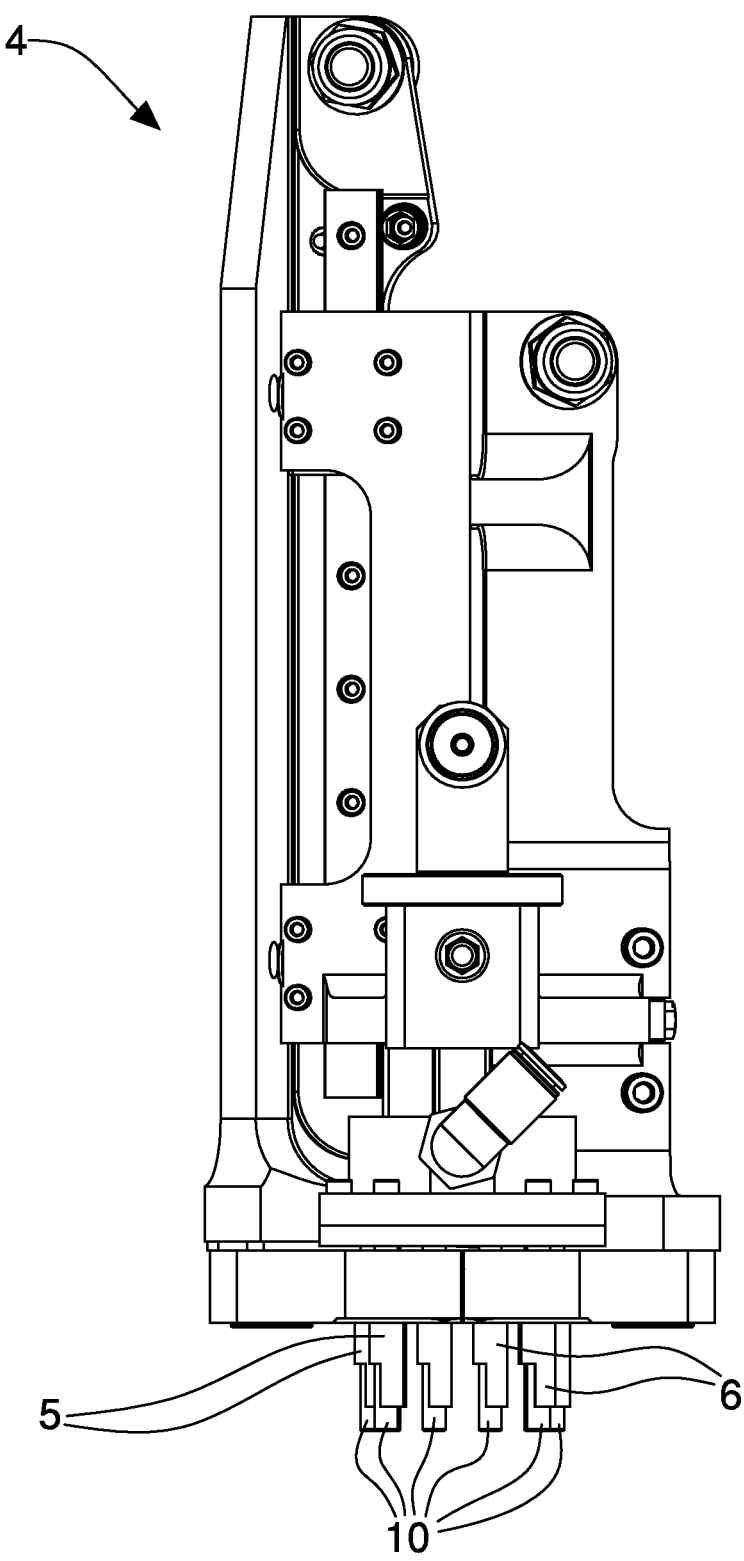
FIG. 2 is a view, in a vertical elevation, of an embodiment of a movable element that carries the dose separating elements according to the invention.

The dose separating elements of the first and of the second group, considered overall, can have, as in the example in FIG. 2, both in the first and in the second configuration, an annular arrangement (in particular with two staggered half-circumferences at different heights) around a (vertical) axis that is transverse to the (horizontal) advancing direction F.

The second group of dose separating elements 6 may be optionally movable on the movable element, particularly by means of a sliding coupling, e.g. along (vertical) linear sliding guides.

It is possible that the first and the second group of dose separating elements are able to take on a third configuration (FIG. 6) in which the various separating elements, considering both groups overall, have an annular arrangement (suitable in particular for expelling the doses), for example a circular arrangement. In this third configuration the overall separating elements may be located at the same vertical height.

The driving device that moves the dose separating elements can include, as in the specific case, a cam-type driver. In particular, the cam can include at least a first annular cam path 7 that is operationally associated (in particular by a cam-following member, for example of the roller type) with the first group of dose separating elements 5 and at least a second annular cam path 8 that operates (in particular by a cam-following member, for example of the roller type) with the second group of dose separating elements 6.

The first group of dose separating elements 5 can comprise, as in the specific example, a first (front) semicircular arrangement of elements. The second group of dose separating elements 6 can comprise, as in this case, a second (rear) semicircular arrangement of elements. The second semicircular arrangement is arranged to the rear of the first semicircular arrangement, with reference to the advancing direction F of the movable element.

The first and the second group of extruder outlets 2 and 3 can have, as in the example disclosed here, an outlet direction of the extruded plastics that is transverse (vertical) to the (horizontal) advancing direction F of the movable element.

The extruding device includes, in the case in point, an extruder with an inlet 11 for the synthetic plastics and a plurality of supply channels 12 for supplying synthetic plastics to the various outlets 2 and 3.

Figure 11:
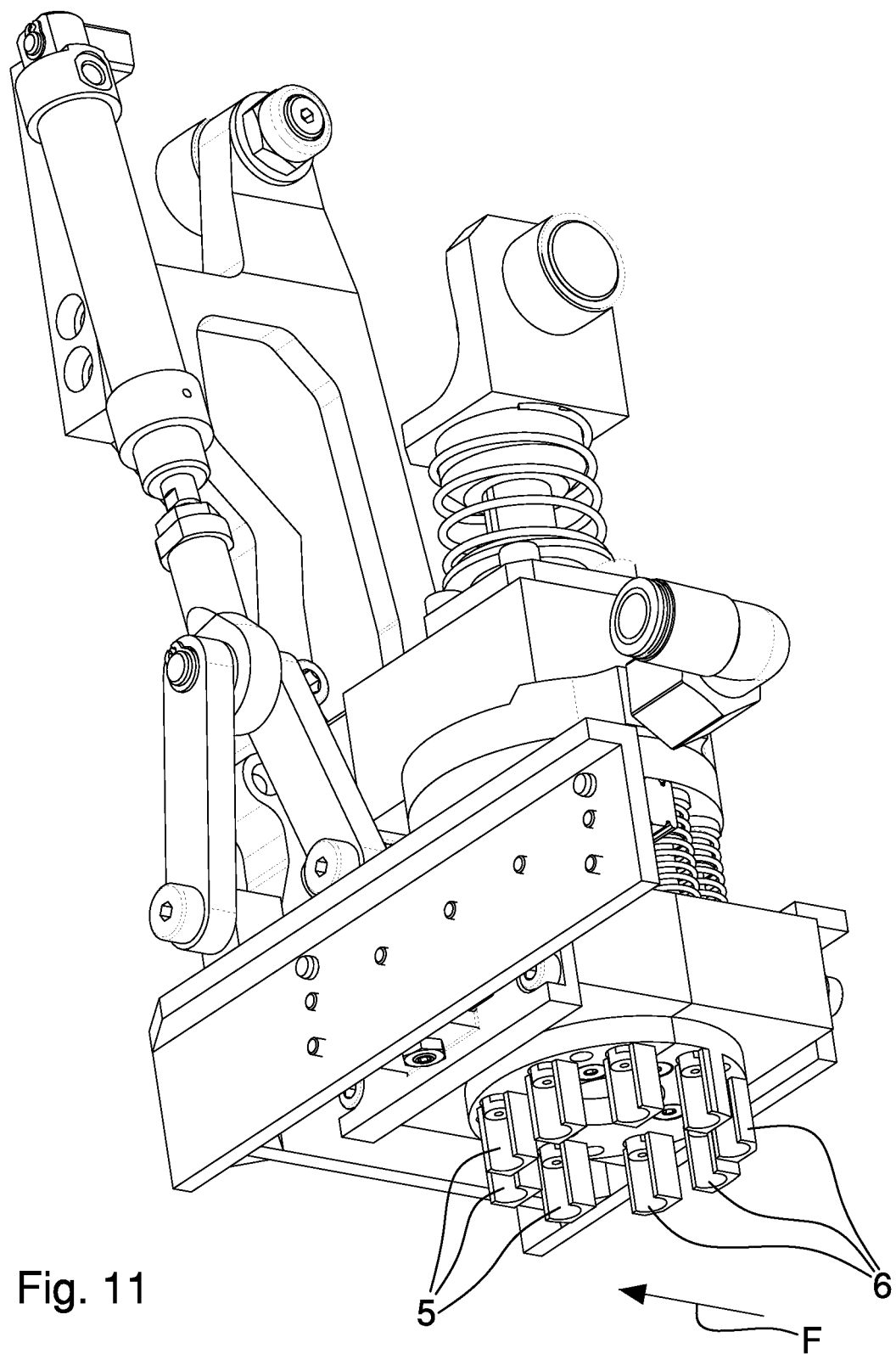
FIG. 11 shows another embodiment of a movable element that carries the dose separating elements according to the invention.
Figure 12:
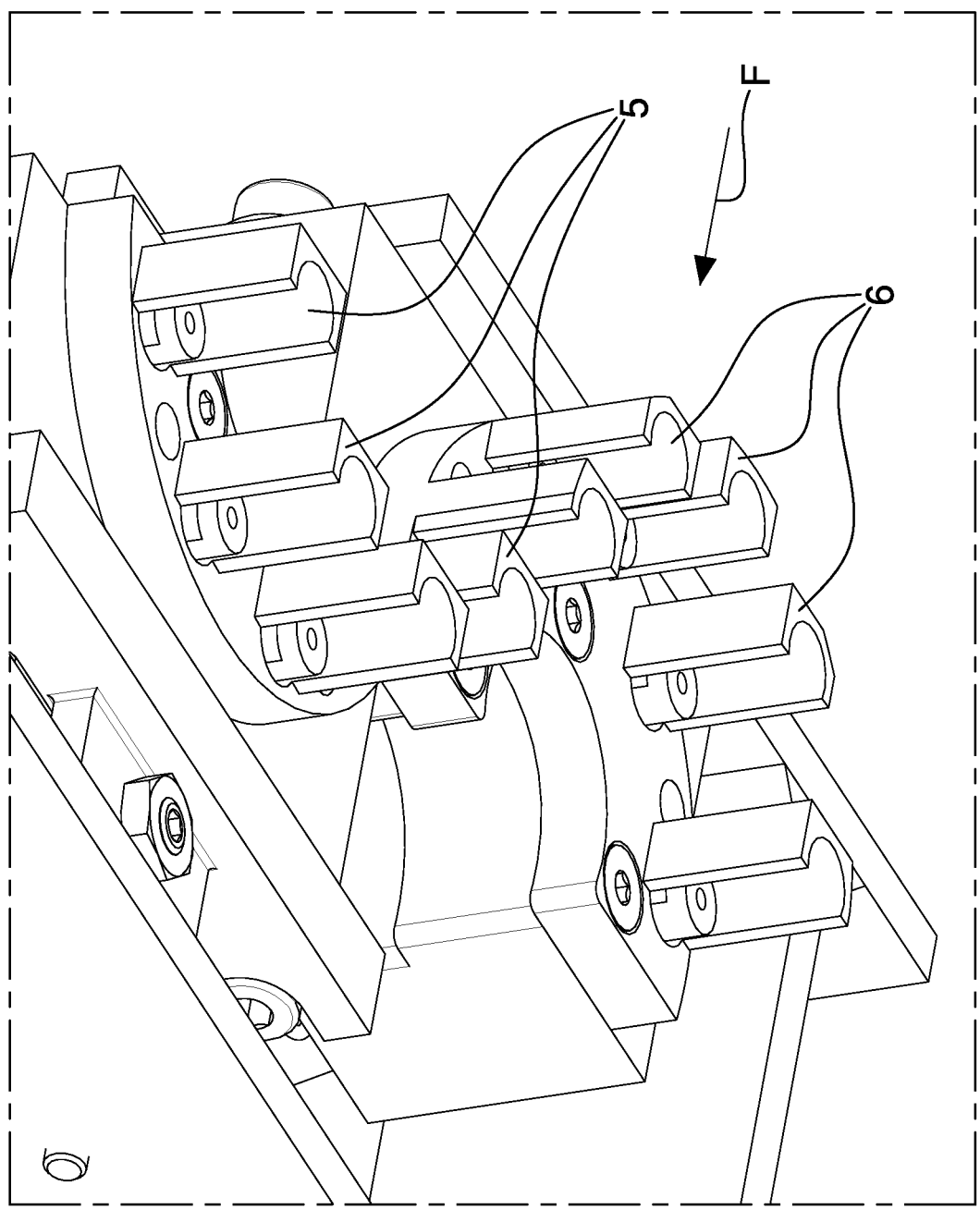
FIGS. 12 and 13 show, on an enlarged scale, the dose separating elements of the movable element in FIG. 11 in two different operating configurations.
Figure 13:
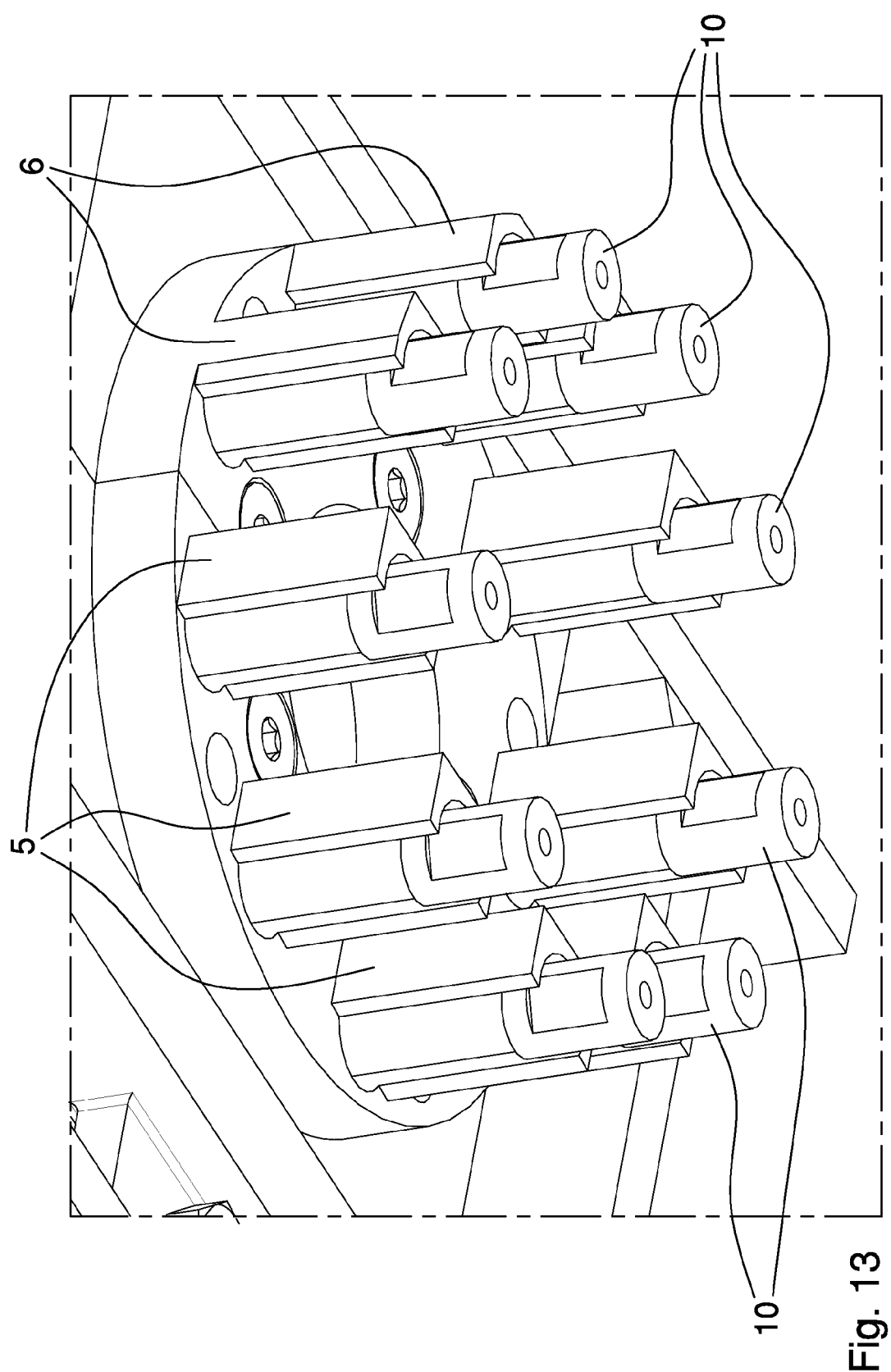

In the example illustrated in FIGS. 11 to 13 (for similar elements the same numbering has been used for the sake of simplicity), the first group of (front) dose separating elements 5 is movable on the movable element 4 in a (horizontal) direction that is transverse to the (vertical) outlet direction of the extruded plastics, being able to assume the first configuration (FIG. 12), wherein the first group of dose separating elements 5 is distanced (laterally) from the second group of extruder outlets (not shown and arranged for being operationally associated with the second group of dose separating elements 6), and being further able to take on the second configuration (FIG. 11), in which the dose separating elements of the first and of the second group have, overall, an annular arrangement and in which, moreover, the first group of dose separating elements 5 can separate the doses from the first group of extruder outlets (not shown and arranged for being operationally associated with the first group of dose separating elements). The first group of dose separating elements 5 can be movable in a linear direction (horizontal and/or arranged radially with respect to a rotation axis of the movable element 4) along sliding guides.

Figure 14:
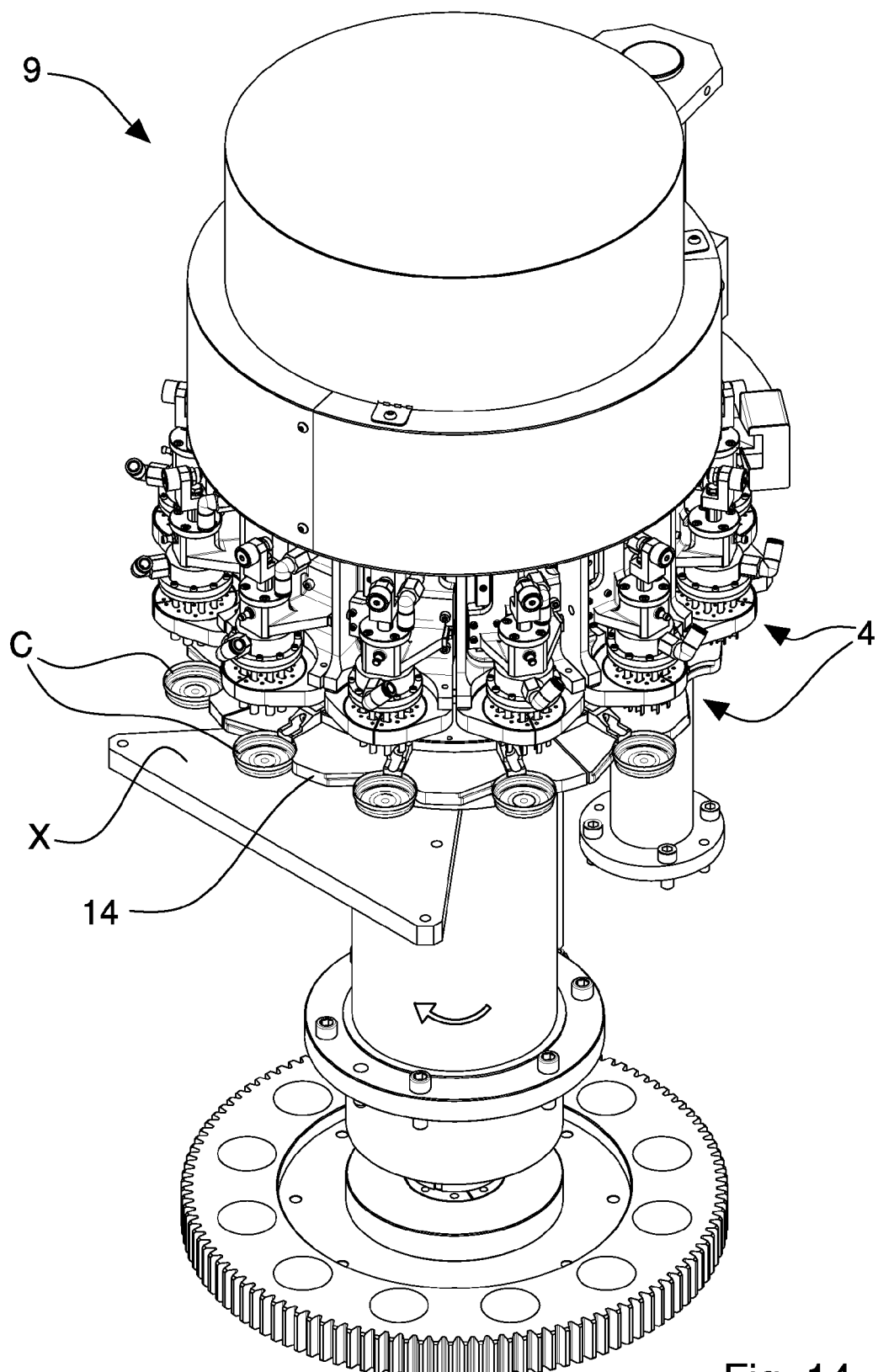
FIG. 14 is a view of a device for separating multiple extruded doses having a plurality of movable elements like those in FIG. 2 or in FIG. 11.
Figure 15:
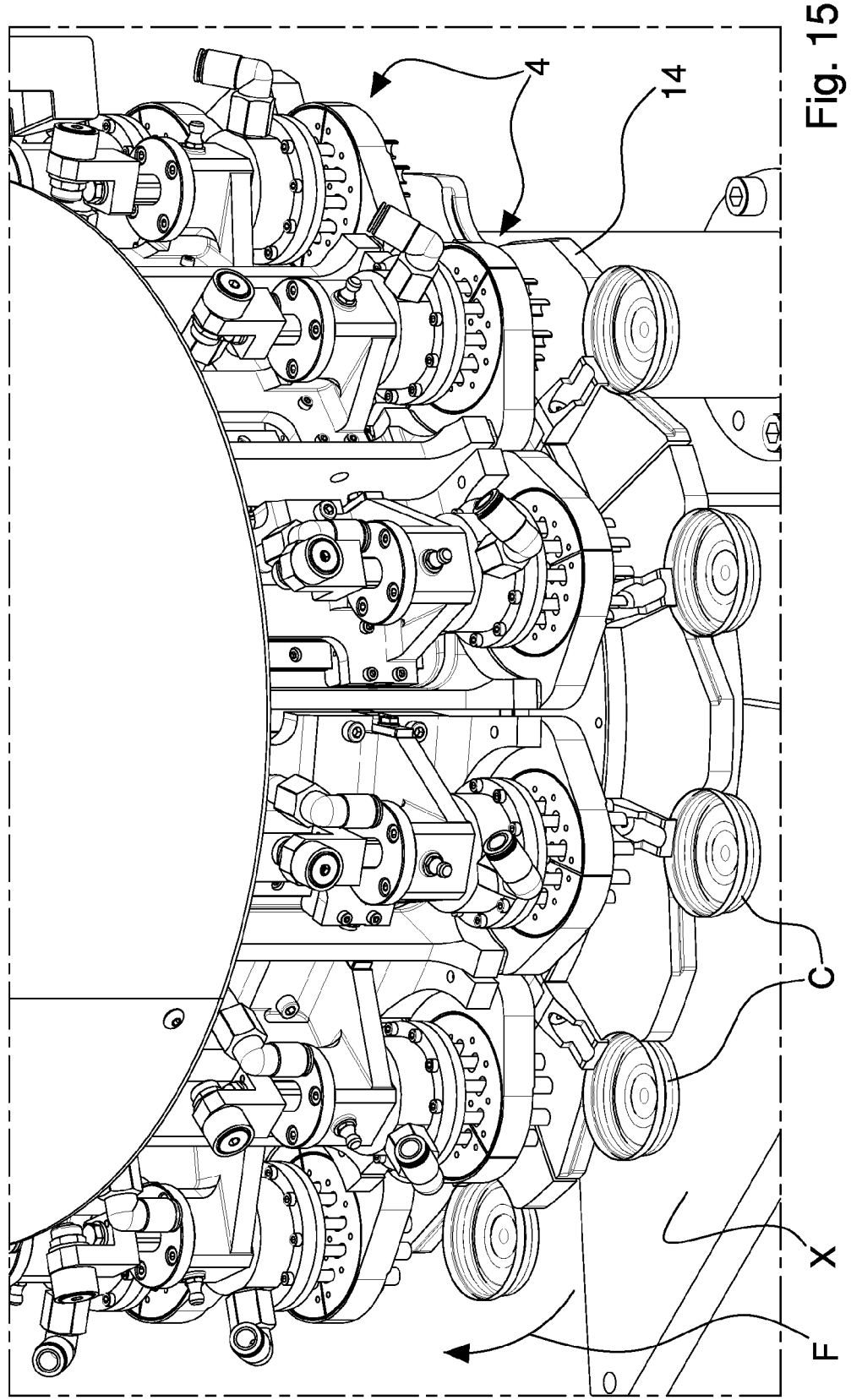
FIG. 15 shows a detail in FIG. 14 on an enlarged scale.

For each of the examples disclosed above and below, each separating device 1 can comprise, for example, a rotating carousel 9 (FIG. 14), for example rotating around a vertical rotation axis, that carries a plurality of movable elements 4, each of which can comprise a movable element according to any one of the examples disclosed here. The movable elements 4 can be mounted on the carousel spaced angularly (at equal distances) from one another. The carousel 9 can comprise, for example, a conveying wheel 14 to convey the closures C along a set (circular) path along which the multiple doses will be placed inside each closure C. The closures will be sent to a device (which is not shown) for compression moulding of doses to obtain the seal liner/s.

In each of the examples disclosed here, each of the dose separating elements (both of the first group, the second group, and of any further possible groups of elements) can include a device for expelling the dose in an expelling direction, for example downwards. In the specific cases disclosed here, the expelling device includes, for example, an expelling member 10 (one for each dose separating element), for example in the shape of a cylinder, which is movable in the expelling direction (for example vertically) inside the respective dose separating element. The expelling device for expelling the dose can be commanded by a driving device, for example of the cam type. In the specific case the device includes a driver that is suitable for driving the dose expelling device and includes a third annular cam path 13 that operates (in particular by a cam-following member, for example of the roller type) the expelling device (expelling member 10).

Figure 3:
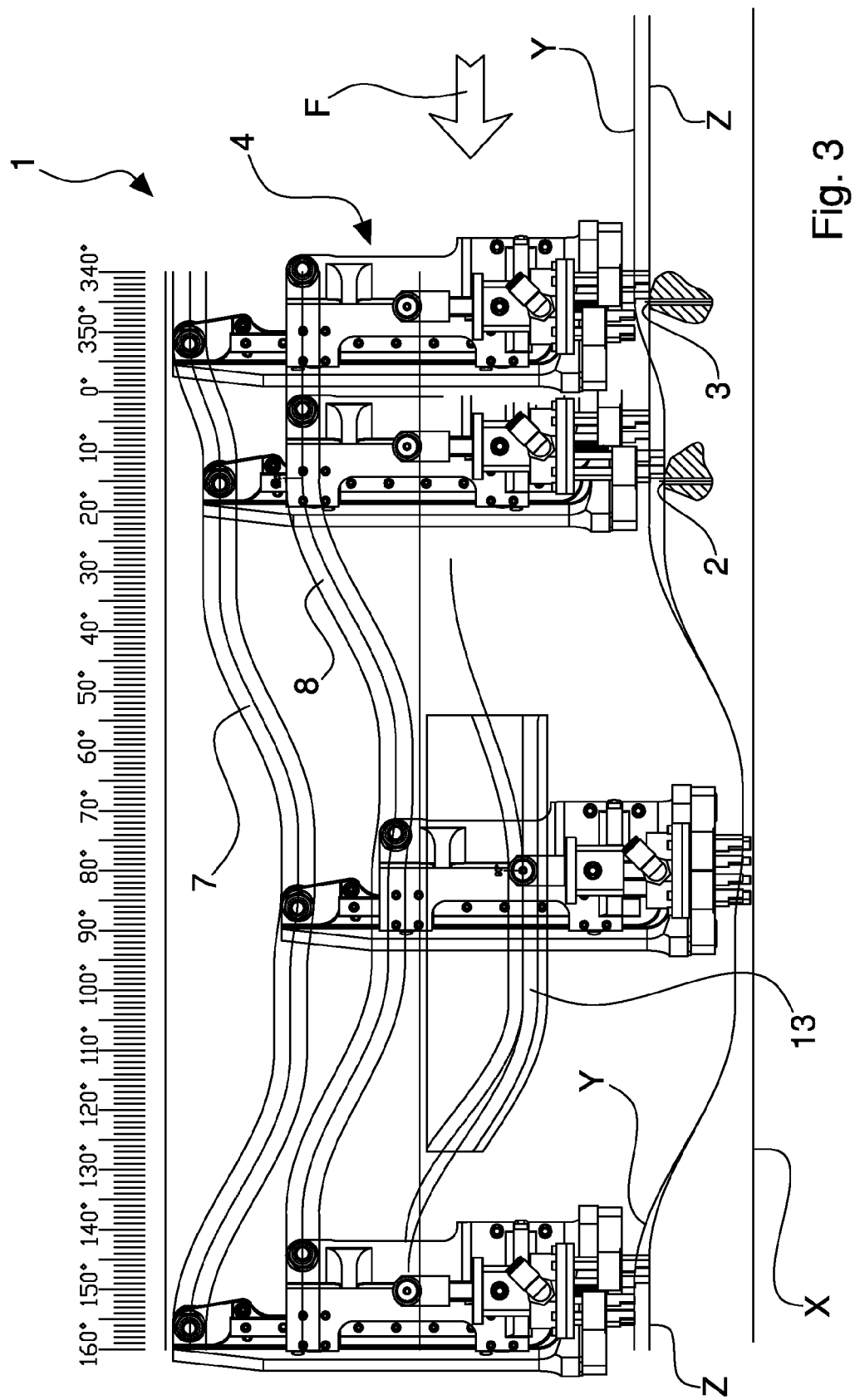
FIG. 3 is a diagram of a sequence of the movement of the movable element in FIG. 2.

It is observed that in the drawing in FIG. 3 the cam paths 7 and 8 (and 13) extend flat, although in the disclosed example these cam paths extend in a circumferal direction, for example in a circumferal direction that is coaxial to the rotation axis of the movable element 4 (in particular coaxial to the carousel 9 that carries the movable elements).

The operation of the device is clear from what has been disclosed previously. Each movable element rotates carried by the carousel 9. At each revolution of the carousel, the second (rear) group of dose separating elements 6 initially separates the doses from the second group of extruder outlets 3 (rear and upper), with the first group of dose separating elements 5 in the first (raised) non-interference configuration. Subsequently, the first group of dose separating elements 5 lowers to separate the doses from the first group of extruder outlets 2 (front and lower). Subsequently, both the first group and the second group of dose separating elements 5 and 6 take on the third configuration (of dose deposition), in which they are (at the same height) near a conveying plane X along which the container closures slide. In FIG. 3 the trajectory of the first group of dose separating elements 5 has been indicated by Y and the trajectory of the second group of dose separating elements 6 has been indicated by Z. At each revolution, the movable element can deposit the doses in a circular arrangement inside a closure for containers (which is not illustrated) that slides on the conveying plane X. Depositing can be facilitated by the expelling device, in particular by the expelling members 10, that, by sliding downwards at the command of the driver, push the doses downwards (FIG. 6).

Figure 17:
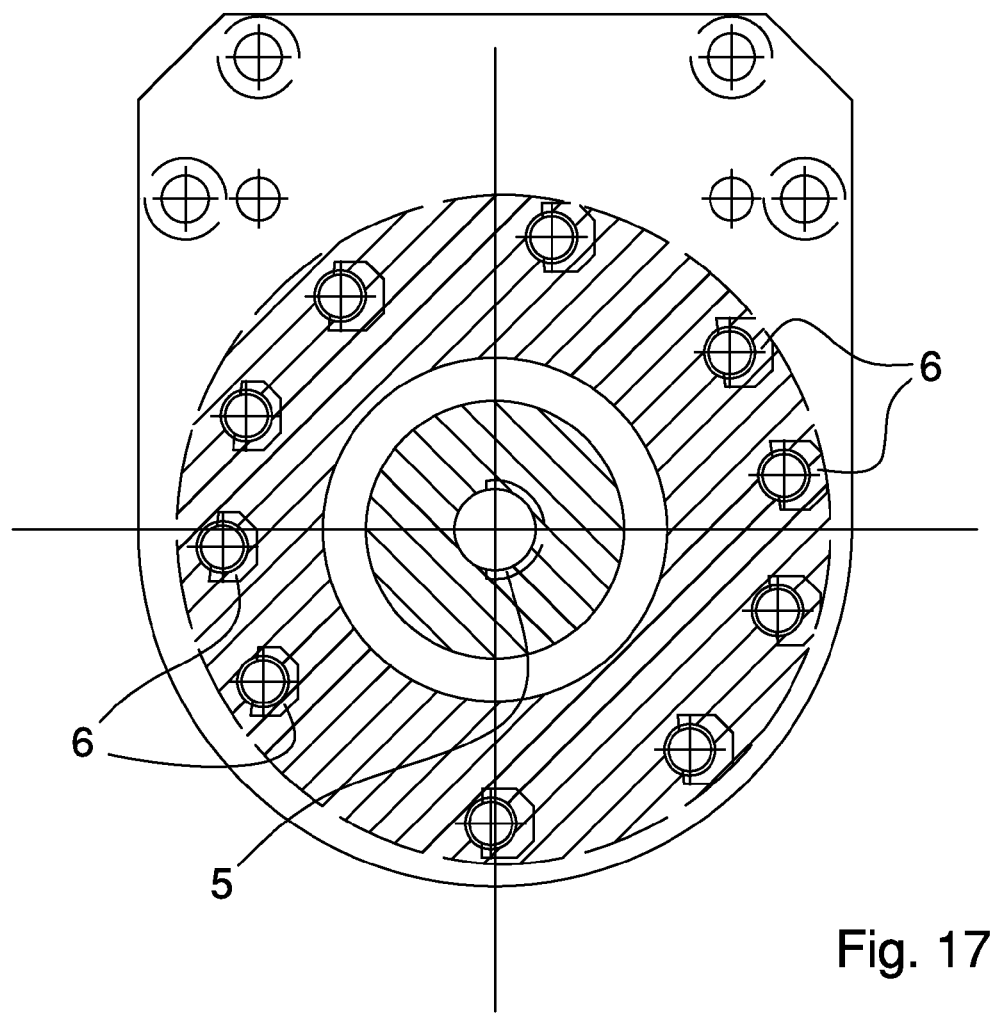
FIG. 17 is a section along a horizontal plane of any of the movable elements in FIG. 16.

The extruding device can include, as for example in the embodiment illustrated in FIGS. 16 and 17, a first extruder 15 that can have a first flow of synthetic plastics operationally associated with a first group of extruder outlets 2 and a second extruder 16 that can have a second flow of synthetic plastics, distinct from the first flow of plastics, operationally associated with a second group of extruder outlets 3.

In one embodiment, for example like the one illustrated in FIGS. 16 and 17, a second group of dose separating elements 6 (also in this case, for the sake of simplicity, for similar elements, the same numbering as used before has been left) can comprise a second annular arrangement (for example circular) of elements and a first group of dose separating elements 5 can comprise a first arrangement of elements that can be arranged inside and surrounded by the second annular arrangement of elements. The second arrangement of elements can comprise three of more elements arranged, for example, circumferally. The first arrangement of elements could be arranged concentrically with respect to the second circular arrangement (for example inside or outside the arrangement). In the specific case illustrated here, the second group of dose separating elements 6 (external group) comprises a plurality of (ten) elements (with circular arrangement) and the first group of dose separating elements 5 (internal group) comprises a single element (arranged inside the second group of elements).

The extruder outlets 3 of the second group (associated with the second extruder 16 of a second plastic material) will thus be ten (for example aligned), whilst the first group of extruder outlets 2 (associated with the first extruder 16 of a first plastic material that is optionally different from the second plastic material) will comprise a single extruder outlet 2 (in the specific case bigger than each of the outlets 3).

The first group of dose separating elements 5 can be, in this example, movable on the movable element that carries the separating elements in a movement direction, for example parallel to the (vertical) axis of concentricity of the first and second circular arrangement of elements. The second group of dose separating elements 6 can be, in this example, movable on the movable element in a movement direction, for example, parallel to the (vertical) movement direction of the first group of dose separating elements 5. The movable element can thus have at least three operating configurations in which: (i) the second group of dose separating elements 6 (external group) is arranged below with respect to the first group of dose separating elements 5 (internal group) to be able to separate the doses of plastic D from the extruder outlets 3 of the second extruder 16 (to the right in FIG. 16), without there being an interference of the first group of dose separating elements 5; (ii) the first group of dose separating elements 5 (internal group) is arranged below the second group of dose separating elements 6 (external group) in order to be able to separate the doses of plastic D from the group of extruder outlets 2 of the first extruder 15 formed by a single outlet (in the centre in FIG. 16); and (iii) the first group of dose separating elements 5 and the second group of dose separating elements 6 are arranged substantially at the same height to be able to place the doses of plastic D inside a closure C (to the left in FIG. 16).

Figure 18:
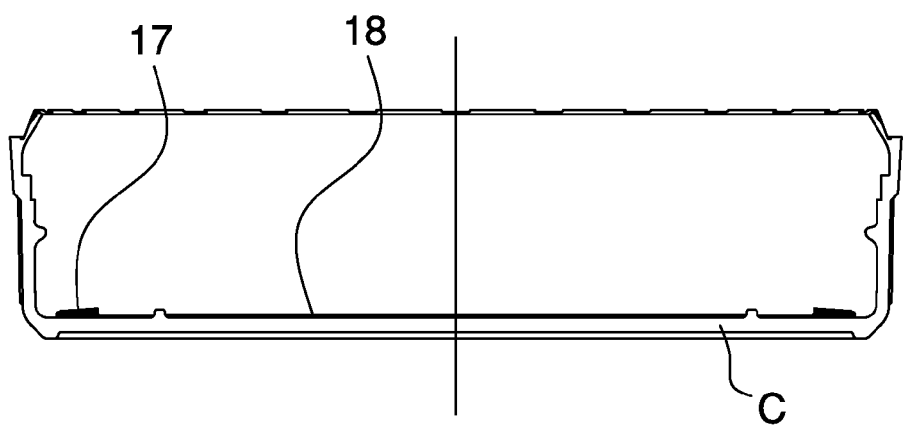
FIG. 18 shows an example of a closure for containers with liners that can be made by using the movable elements in FIG. 16.

The closure C will then be sent to the step where the liner/s are formed, for example by compression of the doses D, to obtain the closure C, illustrated in FIG. 18, having a first external liner 17, for example annular (in the form of a circular crown), and a second internal liner 18, for example full (circular). The two liners 17 and 18 can be made of plastic materials having at least one chemical-physical feature different from one another.

The extruding means device illustrated in FIGS. 19 to 22 includes a plurality of extruder outlets, for example of the second group of extruder outlets 3, in which one or more of the extruder outlets each includes a flow adjusting device which meters the flow of plastics that leave the respective extrusion outlet. Such a flow adjusting device can include, for example, an adjusting member 19 arranged in the synthetic plastics flow path and movable transversely to the flow direction to selectively increase or decrease the passage section of the material. The position of each adjusting member 19 can be varied by a driving device, for example of manual type. The driving device can include a screw coupling to enable the adjusting member 19 to move axially. The latter can be fixed in position by a locking member 20 (for example of the screw type). In the specific case all the extruder outlets are provided with a flow adjusting means device but the last outlet (FIG. 22), i.e. the outlet that is farther from the supply of the flow of synthetic plastics, which can be left, for example, always completely open, so the other outlets are regulated as a function of the latter. It is possible to provide other examples, which are not illustrated, in which the flow adjusting device is associated with all the extruder outlets, or in which the flow adjusting device is not set up on one or more extruder outlets that is different from the latter.

Figure 19:
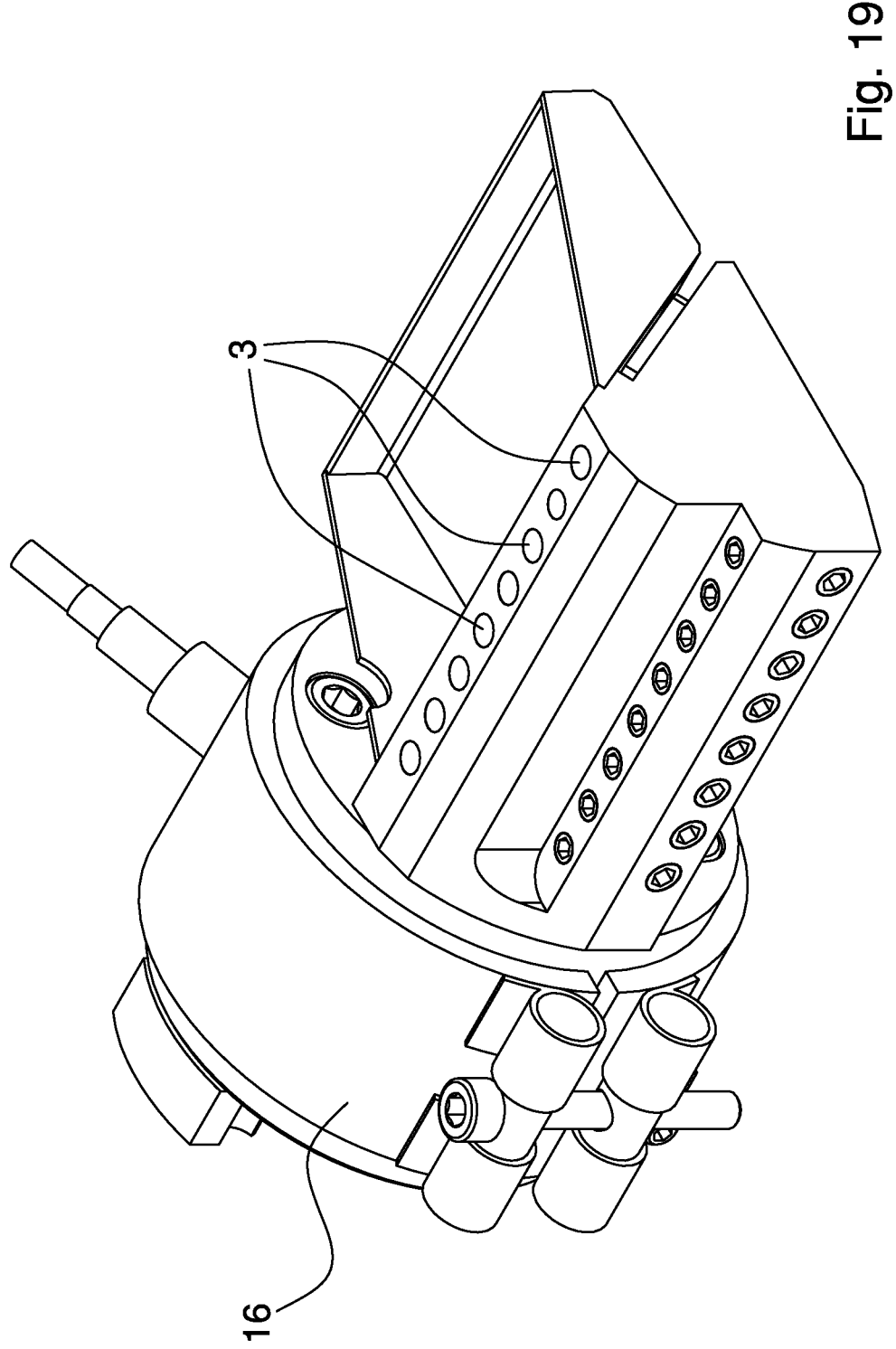
FIG. 19 is a perspective view of an example of the extruding device that is associated with a movable element according to the invention.
Figure 20:
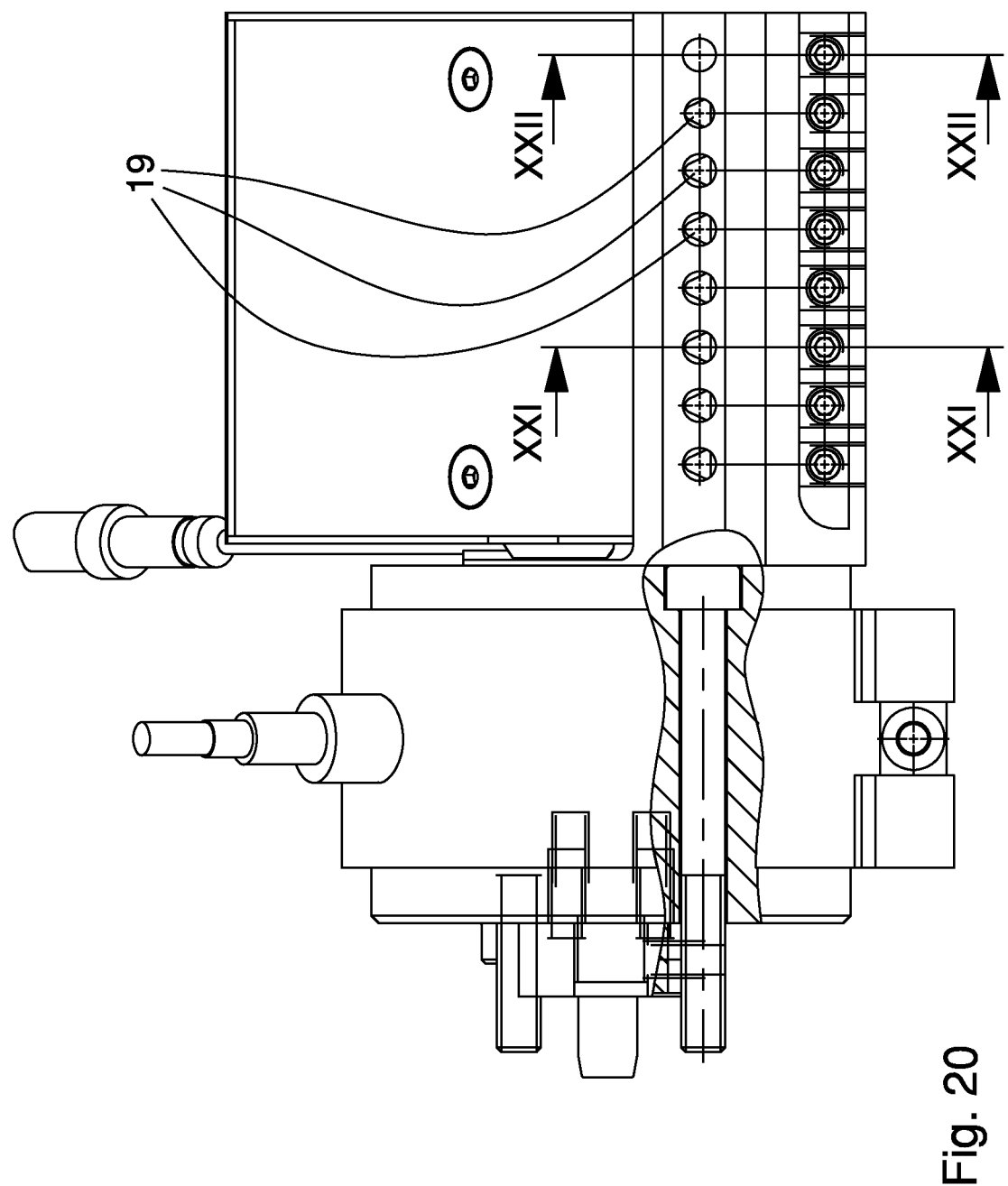
FIG. 20 is a partially sectioned top plan view of FIG. 19.
Figure 22:
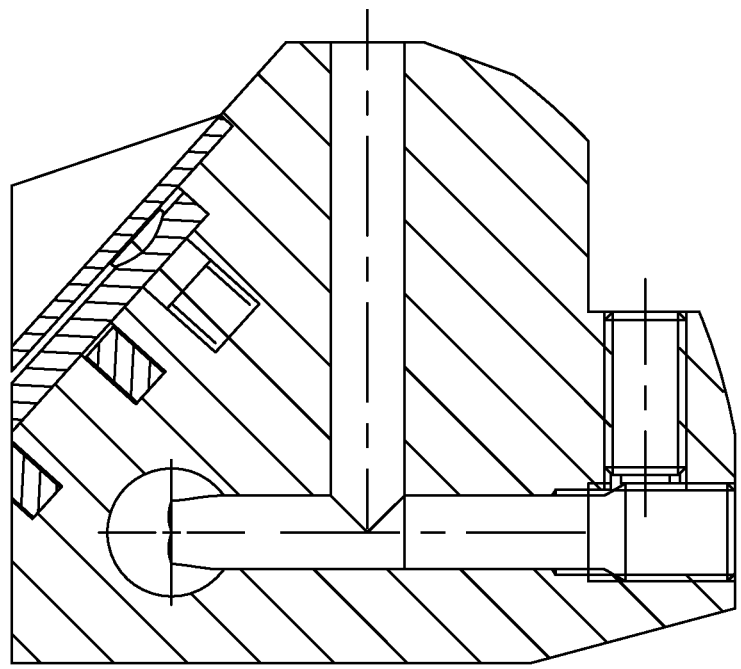
FIG. 22 is the section XXII-XXII in FIG. 20.
Figure 21:
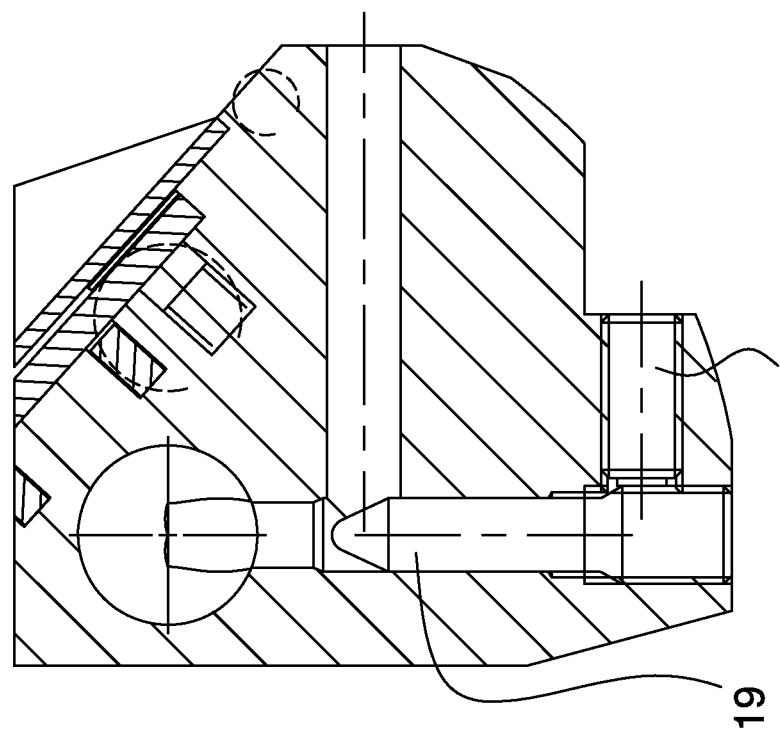
FIG. 21 is the section XXI-XXI in FIG. 20.

The extruding device in FIG. 19 includes a plurality of extruder outlets arranged aligned on one another. The rectilinear arrangement of extruder outlets can be applied, in a specific but not exclusive manner, to a movable element (such as, for example, the one in FIGS. 11-13) including a first part of movable element that is movable laterally with respect to a second part of movable element, in which the lateral movement can be in a (horizontal) direction that has at least one radial component with respect to the rotation axis of the rotating support (carousel) supporting and moving the movable element.

The flow adjusting device adjusts the extrusion flow associated with both the extruder outlets 2, and the extrusion outlets 3.

In an example that is not shown, the separating device can include at least a third group of dose separating elements carried by the movable element and arranged to separate, at each revolution of the movable element, doses of synthetic plastics from at least a third group of extruder outlets of the extruding device.

For each of the examples disclosed here, the separating device can include, for example, a first and a second group of extrusion outlets in which the extrusion outlets are arranged with an upward (vertical) outlet direction of the synthetic plastics. Nevertheless, it is possible to provide the extruding device with different outlet directions of the extruded material, for example (vertical) downwards, horizontally, or obliquely.

In each of the examples disclosed here, each of the dose separating elements (of the first, of the second and of possible further groups of elements) can be opened below to release the dose in a (vertical) expelling direction downwards and can further be conformed into a forwardly facing concave shape, with reference to the advancing direction F. In particular, each of the dose separating elements has a U-shaped cross section with the forwardly facing concave shape. It is nevertheless possible to provide dose separating elements having other conformations.

Each of the movable elements has a first group of dose separating elements that includes a first horizontal arrangement of elements, in which this first horizontal arrangement is movable on the movable element (for example in a vertical or horizontal direction). It is nevertheless possible to provide other arrangements (vertical, oblique, or a combination thereof) and/or different movement directions that are suitable for enabling the doses to be separated from the extruding device.

Each of the movable elements has a second group of dose separating elements that includes a second horizontal arrangement of elements, in which this second horizontal arrangement is movable on the movable element in a direction (for example in a vertical direction). It will also be possible to provide other arrangements (vertical, oblique, or a combination of them) and different movement directions of the second group of dose separating elements, that are nevertheless suitable for separating the doses from the extruding device.

The invention claimed is:

1. A device for separating doses of synthetic plastics, comprising
   (a) an extruding device for extruding synthetic plastics comprising a first group of extruder outlets and a second group of extruder outlets arranged at a higher elevation than said first group of extruder outlets;
   (b) a movable element that is movable in an advancing direction along a closed loop path which passes adjacent said extruding device for each revolution of said movable element;
   (c) at least one first group of dose separating elements mounted on said movable element, said first group of dose separating elements separating and removing doses of synthetic plastics from said first group of extruder outlets, respectively, as said first group of dose separating elements passes said first group of extruder outlets for each revolution of said movable element; and
   (d) at least one second group of dose separating elements mounted on said movable element, said second group of dose separating elements separating and removing doses of synthetic plastics from said second group of extruder outlets, respectively, as said second group of dose separating elements passes said second group of extruder outlets for each revolution of said movable element;
   wherein said first group of dose separating elements is vertically movable on said movable element between a first raised configuration above said second group of extruder outlets in which said first group of dose separating elements does not interfere with said second group of extruder outlets or with the synthetic plastics that exit therefrom during movement of said movable element along said closed loop path, and a second lowered configuration in which said first group of dose separating elements is adjacent said first group of extruder outlets, said first group of dose separating elements being moved to said first configuration after passing said first group of extruder outlets and before passing said second group of extruder outlets and being moved to said second configuration after passing said second group of extruder outlets and before passing said first group of extruder outlets, for each revolution of the movable element.

2. A device as defined in claim 1, wherein said first group of dose separating elements is arranged after said second group of dose separating elements, with reference to said advancing direction.

3. A device as defined in claim 1, wherein said first group of dose separating elements defines, in said second configuration, a space arranged, with reference to said advancing direction, in front of said second group of dose separating elements.

4. A device as defined in claim 1, wherein the dose separating elements of said first and second groups are annularly arranged on said movable element to enable the doses to be expelled in a corresponding annular arrangement.

5. A device as defined in claim 1, wherein said second group of dose separating elements is vertically movable on said movable element, said first and second groups of dose separating elements being movable to a third configuration wherein they are arranged at the same vertical height above said second group of extruder outlets for expelling the doses.

6. A device as defined in claim 1, and further comprising a cam having at least a first annular cam path for said first group of dose separating elements and at least a second annular cam path for said second group of dose separating elements to selectively displace said first group of dose separating elements to said first configuration and to said second configuration, respectively.

7. A device as defined in claim 1, wherein said first and second groups of dose separating elements are arranged in first and second semicircles, said second group of dose separating elements being located behind the first group of dose separating elements with reference to said advancing direction.

8. A device as defined in claim 1, wherein said first and second groups of extruder outlets have an outlet direction of the extruded synthetic plastics that is transverse to said advancing direction, and said first group of dose separating elements is movable on said movable element in a direction that is transverse to said outlet direction taking on said first configuration, in which said first group of dose separating elements is far from said second group of extruder outlets, and said second configuration, in which the dose separating elements of said first and second groups overall have an annular arrangement.

9. A device as defined in claim 1, wherein said extruding device comprises a first extruder having a first flow of synthetic plastics operable with said first group of extruder outlets and a second extruder having a second flow of synthetic plastics, distinct from the first, operable with said second group of extruder outlets.

10. A device as defined in claim 1, and further comprising at least a third group of dose separating elements carried by said movable element to separate, at each revolution of the movable element, at least one dose of synthetic plastics from at least a third group of extruder outlets of said extruding arrangement.

11. A device as defined in claim 1, and further comprising a flow adjusting device for adjusting the flow of extruded synthetic plastics operable with at least one of the extruder outlets of said first and second groups of extruder outlets, respectively.

12. A device for separating doses of synthetic plastics, comprising:
- (a) an extruding device having a vertical axis for extruding synthetic plastics comprising a first group of extruder outlets and a second group of extruder outlets arranged at a higher elevation than said first group of extruder outlets;
- (b) a movable element that is movable in an advancing direction along a closed loop path which passes adjacent said extruding device for each revolution of said movable element;
- (c) at least one first group of dose separating elements mounted on said movable element, said first group of dose separating elements separating and removing doses of synthetic plastics from said first group of extruder outlets, respectively, as said first group of dose separating elements passes said first group of extruder outlets, for each revolution of said movable element; and
- (d) at least one second group of dose separating elements mounted on said movable element, said second group of dose separating elements separating and removing doses of synthetic plastics from said second group of extruder outlets, respectively as said second group of dose separating elements passes said second group of extruder outlets, for each revolution of said movable element;

wherein said first group of dose separating elements is movable laterally on said movable element in a direction transverse to said vertical axis between a first configuration in which said first group of dose separating elements does not interfere with said second group of extruder outlets or with the synthetic plastics that exit therefrom during movement of said movable element along said closed loop path, and a second configuration in which said first group of dose separating elements is adjacent and aligned with said first group of extruder outlets, said first group of dose separating elements being moved to said first configuration after passing said first group of extruder outlets and before passing said second group of extruder outlets and being moved to said second configuration after passing said second group of extruder outlets and before passing said first group of extruder outlets, for each revolution of the movable element.

13. A device as defined in claim 1, and further comprising a carousel rotating with a vertical axis that carries a plurality of angularly spaced movable elements; for each movable element, said first group of dose separating elements comprises a horizontal arrangement of elements that is movable on said movable element in a vertical direction; for each movable element, said second group of dose separating elements comprises a horizontal arrangement of elements that is movable on said movable element in a vertical direction; said first and second groups of extrusion outlets comprise outlets arranged with an outlet direction of the plastics that is vertically upward; for each movable element, said first and second groups of dose separating elements comprise separating elements which are each opened below to release the dose downwards in vertical expulsion direction and have a forwardly facing concave shape, with reference to said advancing direction; for each movable element, said first and second groups of dose separating elements comprise separating elements that are each provided with arrangement device for expelling the close downwards, said expelling device comprising an expelling member that is movable vertically inside the respective separating element.

14. A device as defined in claim 12, wherein said second annular configuration of elements is circular, and wherein said first configuration of elements is arranged concentrically with respect to said second circular configuration of elements.

* * * * *